C. J. GARVEY.
CHAIN FASTENING DEVICE.
APPLICATION FILED MAR. 3, 1921.
1,401,067.
Patented Dec. 20, 1921.
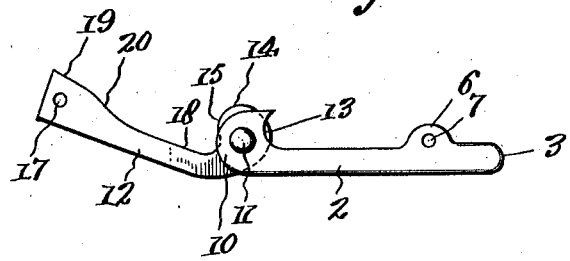
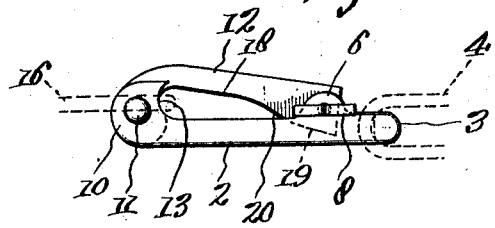
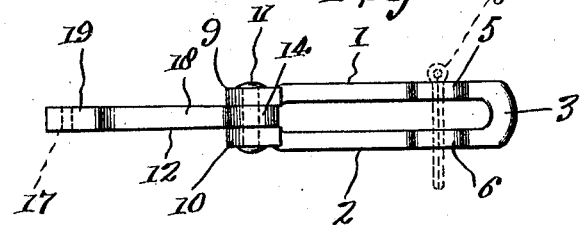
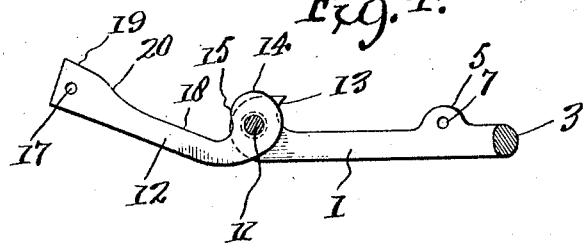
Charles J. Garvey *Inventor*
by Wilkinson & Fiusta
*Attorneys*

UNITED STATES PATENT OFFICE.

CHARLES JOHN GARVEY, OF PORT HENRY, NEW YORK.

CHAIN-FASTENING DEVICE.

1,401,067. Specification of Letters Patent. Patented Dec. 20, 1921.

Application filed March 3, 1921. Serial No. 449,344.

*To all whom it may concern:*

Be it known that I, CHARLES JOHN GARVEY, a citizen of the United States, residing at Port Henry, in the county of Essex and State of New York, have invented certain new and useful Improvements in Chain-Fastening Devices; and I do hereby declare the following to be a full, clear, and exact description of the invention, such as will enable others skilled in the art to which it appertains to make and use the same.

The present invention relates to improvements in chain fastening devices, and it more particularly refers to an improved device for connecting the ends of anti-skid chains for vehicles.

An object of the invention is to provide an improved chain connecting device which is adapted to be locked in position when closed upon the ends of the chain and which is capable of ready detachment whenever required.

Another object of the invention resides in providing an improved device for connecting the ends of anti-skid chains in which the strain developed by the tendency of the chain to pull apart will devolve entirely upon one member and will be caused to extend substantially in alinement, whereby to produce a more durable device and at the same time one substantially simple and economical in construction.

A further object of the invention lies in providing an improved chain connecting device in which the closing of the device on the chain will automatically act to draw it taut in a manner that has heretofore been done by the hand of the operator.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side view of an improved chain fastening device constructed in accordance with the present invention and shown in the open position;

Fig. 2 is a similar view of the device in the closed and locked position and indicating in dotted lines the portions of the links of the chain coupled thereto;

Fig. 3 is a plan view of the device shown in the open position; and

Fig. 4 is a longitudinal sectional view through the device.

Referring more particularly to the drawings, wherein only one embodiment of the invention is shown, 1 and 2 designate the legs of a substantially U-shaped yoke piece having an integral intermediate connecting portion 3 disposed at one end of the device and adapted to receive one link of the chain, such link being indicated in dotted lines at 4 in Fig. 2. The legs 1 and 2 of the yoke piece near, but in slightly spaced relation from the connecting part 3, are formed with upstanding ears 5 and 6 having perforations 7 extending therethrough in alinement and adapted to receive a cotter pin 8 or other suitable device by which the locking lever herein after referred to is effectively secured in place against accidental displacement.

At the free ends of the legs 1 and 2 upturned and upstanding lugs 9 and 10 are formed with perforations therethrough for the passage of a rivet or pivot pin 11 which forms a fulcrum point for the locking lever 12. The lugs 9 and 10 are spaced apart as indicated in substantially the same parallel position with the legs 1 and 2, although such lugs are preferably bent in slightly in order to reinforce laterally the portion of the locking lever engaging therebetween.

The inner faces of the lugs 9 and 10 are curved as indicated at 13 and the enlargement 14 of the locking lever 12, which extends between the lugs 9 and 10 and forms extensive bearing surfaces therewith, is also made with a similar curved surface 15 which is adapted to coincide substantially with the curvature 13 when the lever is in the closed position indicated in Fig. 2.

When these curved surfaces thus register they form a pocket to receive a link indicated at 16 in Fig. 2 which is the opposite link of the chain to be connected together and which passes about the vehicle tire. The strain incident to the tendency of the chain to pull apart therefore devolves mainly upon the yoke member and this action is reinforced at one end by the enlargement 14 of the locking lever 12 which engages the link 16 in common with the curved surface 13 of the lugs 9 and 10. However, any substantial strain is taken off the locking lever 12 as incidental strains devolving on this member would be transmitted to the pivot 11 with probably injurious results.

However, the presence of the enlargement 14 and its curved surface 15 forms in common with the curved surface 13 of the lugs 9 and 10 a substantially continuous and unbroken engaging face from one side to the other of the device for the link 16 and gives the parts a solidity they would otherwise not have.

The lever near its free end is made with a perforation 17 which is adapted to fit between the perforations 7 in the lugs 5 and to register therewith so as to receive in common the cotter pin 8. The inner surface of the lever is formed with high and low surfaces 18 and 19 connected by a curved or cam wall 20. The idea involved in this construction is to cam the link 16 in place and draw the two ends of the chain together in the very act of closing the lever 12.

When assembling the chain on the wheel, the improved connecting device will of course be carried permanently by the link 4, and after the connecting device is drawn as much as possible by hand toward the link 16, such latter link is engaged over the lever 12 and comes in contact with the inclined high surface 19. The lever is then swung over in a clockwise direction about its pivot point 11, and due to the inclination of the high surface 19 and the cam wall 20 the link 16 will be caused to ride downwardly toward the pivot 11 of the link and consequently will be drawn toward the opposite link 4 and the chain will be contracted about the vehicle wheel.

The outer surface of the lugs 9 and 10 is also curved as indicated at 21 so that the link 16 may readily slide thereover so as to be engaged with the curved inner faces 13 and 15 when the lever is finally swung to its ultimate closed position. The cotter key 8 is then inserted through the perforations 7 and 17 and the ends of the cotter spread out in a usual manner. The cotter key, in combination with the lugs 5 and 6 and the perforations 7 and 17, constitute an important feature inasmuch as they lock the lever 12 against accidental displacement.

It is obvious that various changes and modifications may be made in the details of construction and design of the above specifically described embodiment of this invention without departing from the spirit thereof, such changes and modifications being restricted only by the scope of the following claim.

What is claimed is:—

A connecting device for chains comprising a U-shaped yoke member having an integral connecting piece at one of its ends and the other ends thereof being left free and formed into integral lugs having curved inner and outer surfaces, said yoke member also provided with perforated ears extending in spaced relation to the connecting piece, and a locking lever of an elongated construction which is slightly shorter than the yoke piece having an enlargement offset from one end thereof and adapted to rotatably fit between the lugs of the yoke and having a curved inner face adapted to agree with the curved inner face of the lugs when the locking lever is in the closed position, said enlargement of the locking lever forming with the lugs a laterally continuous support for one end of the chain, the other end of the chain being engaged with the yoke connecting piece, said lever having along its inner longitudinal face high and low surfaces with a cam wall connecting the same, said lever having a perforation therein near its free end adapted to lie in registry with the perforations in said ears when the lever is in the closed position, and a removable device adapted to pass through the ears and through the lever to hold the same in locked position, substantially as described.

CHARLES JOHN GARVEY.